(12) United States Patent
Xie et al.

(10) Patent No.: US 8,134,691 B2
(45) Date of Patent: Mar. 13, 2012

(54) LENS CONFIGURATION FOR A THERMALLY COMPENSATED CHROMATIC CONFOCAL POINT SENSOR

(75) Inventors: Yong Xie, Redmond, WA (US); Bernadette T. Baqui, Bothell, WA (US); Benjamin K. Jones, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 201 days.

(21) Appl. No.: 12/727,161

(22) Filed: Mar. 18, 2010

(65) Prior Publication Data
US 2011/0228250 A1    Sep. 22, 2011

(51) Int. Cl.
*G01C 3/08* (2006.01)
(52) U.S. Cl. ...... 356/4.04; 356/3.01; 356/3.1; 356/4.01; 356/4.1; 356/5.01
(58) Field of Classification Search ........ 356/3.01–3.15, 356/4.1–4.1, 5.01–5.15, 6–22, 28
See application file for complete search history.

(56) References Cited

U.S. PATENT DOCUMENTS

| | | |
|---|---|---|
| 3,807,836 A | 4/1974 | Baker |
| 4,505,535 A | 3/1985 | Neil |
| 4,585,349 A | 4/1986 | Gross |
| 4,632,520 A | 12/1986 | Yamakawa |
| 4,854,680 A | 8/1989 | Kikuchi |
| 5,202,792 A | 4/1993 | Rollin |
| 5,210,650 A | 5/1993 | O'Brien |
| 5,260,828 A | 11/1993 | Londono |
| 5,386,312 A | 1/1995 | Spencer |
| 5,412,510 A | 5/1995 | Iizuka |
| 5,666,228 A | 9/1997 | Yamamoto |
| 5,785,651 A | 7/1998 | Kuhn |
| 6,081,384 A | 6/2000 | Mori |
| 6,108,071 A * | 8/2000 | Landry et al. ................ 356/5.05 |

(Continued)

FOREIGN PATENT DOCUMENTS

DE    10 2008 024 598 A1    12/2008

(Continued)

OTHER PUBLICATIONS

Bass, M., and C. M. DeCusatis et al., "Handbook of Optics, Third Edition vol. II: Design, Fabrication and Testing; Sources and Detectors; Radiometry and Photometry," McGraw-Hill, 2010, p. 8.13.

(Continued)

*Primary Examiner* — Thomas Tarcza
*Assistant Examiner* — Luke Ratcliffe
(74) *Attorney, Agent, or Firm* — Christensen O'Connor Johnson Kindness PLLC

(57) ABSTRACT

A chromatically dispersive lens configuration including thermal compensation may be utilized in chromatic confocal point sensor optical pens for chromatic range sensing. The lens configuration may include a negative power doublet lens and a positive power lens portion. The positive power lens portion comprises at least two lens elements which compensate for the overall thermal sensitivity of a chromatic confocal point sensor optical pen. The lens elements of the positive power lens portion which compensate for thermal sensitivity have an average coefficient of thermal defocus which is in a range that is at lowest 10 ppm per 10° C. The lens configuration can be implemented with dimensions which fit a standard commercial chromatic confocal point sensor optical pen, while maintaining a level of optical performance sufficient for chromatic range sensing.

20 Claims, 4 Drawing Sheets

U.S. PATENT DOCUMENTS

| | | | |
|---|---|---|---|
| 6,688,783 | B2 | 2/2004 | Janosik |
| 6,731,838 | B1 * | 5/2004 | Dueck et al. ............... 385/37 |
| 7,477,401 | B2 | 1/2009 | Marx |
| 7,561,273 | B2 | 7/2009 | Stautmeister |
| 7,626,705 | B2 | 12/2009 | Altendorf |
| 2004/0109170 | A1 | 6/2004 | Schick |
| 2006/0109483 | A1 | 5/2006 | Marx |
| 2008/0186478 | A1 * | 8/2008 | Moroni et al. ............... 356/73 |
| 2008/0239278 | A1 | 10/2008 | Altendorf |
| 2008/0239323 | A1 | 10/2008 | Sesko |
| 2010/0128264 | A1 | 5/2010 | Hoenicka |

FOREIGN PATENT DOCUMENTS

| | | |
|---|---|---|
| WO | 96/41123 A1 | 12/1996 |
| WO | 02/08685 A2 | 1/2002 |
| WO | 20041034244 A1 | 4/2004 |

OTHER PUBLICATIONS

European Search Report mailed Aug. 18, 2008, in EP Application No. 08102239.4, filed Mar. 4, 2008, 5 pages, corresponding to U.S. patent No. 7,626,705.

Fu, Y. and N.K.A. Bryan, "Design of Hybrid Micro-Diffractive-Refractive Optical Element with Wide Field of View for Free Space Optical Interconnections," Optics Express 10(13):540-549, Jul. 1,2002.

Geary, J.M., "Introduction to Lens Design," Willmann-Bell, 2002, p. 176.

Jamieson, T.H., "Althermalization of Optical Instruments from the Optomechanical Viewpoint," Critical Review CR43:131-159, Optomechanical Design, ed. P.R. Youder, Jr., Jul. 1992.

Jamieson, T.H., "Thermal Effects in Optical Systems," Optical Engineering 20(2):156-160, Mar./Apr. 1981.

Molesini, G., and F. Quercioli, "Pseudocolor Effects of Longitudinal Chromatic Aberration," J. Optics (Paris) 17(6)279-282.

Smith, W.J., "Modern Optical Engineering," 3d ed., McGraw-Hill, 2000, p. 94.

Stil S.A., "Optical Pens Micrometric Measurement Range," Aix-en-Provence, France, brochure, published on or before Mar. 6, 2007,2 pages.

Villatoro. J., et al., "Fabrication and Modeling of Uniform-Waist Single-Mode Tapered Optical Fiber Sensors," Applied Optics 42(13):2278-2283, May 1,2003.

European Search Report mailed Jul. 22, 2011, in corresponding European Application No. EP 11158835.6, filed Mar. 18, 2011, 7 pages.

Rogers, P.J., and M. Roberts, "Thermal Compensation Techniques," in M. Bass (ed.), "Handbook of Optics," McGraw-Hill, Inc., 2d ed., vol. I, 1995, pp. 39.1-39.16.

\* cited by examiner

| Lens Element | $\nu_i$ | $n_i$ | $\chi_i$ | $\alpha_{Ti}$ |
|---|---|---|---|---|
| 101A | 25.4 | 1.8 | 6.4 | 8.9 |
| 101B | 45.8 | 1.5 | 1.5 | 8.2 |
| 102 | 35.3 | 1.7 | -0.5 | 7.3 |
| 103 | 63.3 | 1.6 | 15.7 | 10.1 |
| 104 | 26.3 | 1.8 | 6.1 | 8.8 |

*Fig.2.*

LENS CONFIGURATION FOR A THERMALLY COMPENSATED CHROMATIC CONFOCAL POINT SENSOR

FIELD OF THE INVENTION

The invention relates generally to precision measurement instruments, and more particularly to a chromatic sensor lens configuration such as may be utilized in an optical pen for chromatic confocal range sensing.

BACKGROUND OF THE INVENTION

Controlled chromatic aberration techniques may be utilized for distance sensing metrology applications. As described in "Pseudocolor Effects of Longitudinal Chromatic Aberration," G. Molesini and S. Quercioli, *J. Optics* (Paris), 1986, Volume 17, No. 6, pages 279-282, controlled longitudinal chromatic aberration may be introduced in an optical imaging system, causing the imaging system focal length to vary with wavelength, which provides means for optical metrology. In particular, a lens can be designed whose back focal length (BFL) is a monotonic function of wavelength. In white light operation such a lens exhibits a rainbow of axially dispersed foci that can be used as a spectral probe for distance sensing applications.

It is also known to use chromatic confocal techniques in optical height sensors. As described in U.S. Pat. No. 7,477,401, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the height of the surface determines which wavelength is best focused. Upon reflection from the surface, the light is refocused onto a small detector aperture, such as a pinhole or the end of an optical fiber. Upon reflection from a surface and passing back through the optical system to the in/out fiber, only the wavelength that is well-focused on the surface is well-focused on the fiber. All of the other wavelengths are poorly focused on the fiber, and so will not couple much power into the fiber. Therefore, the signal level will be greatest for the wavelength corresponding to the height of the object. A spectrometer at the detector measures the signal level for each wavelength, which effectively indicates the height of the object.

Certain manufacturers refer to a practical and compact optical assembly that is suitable for chromatic confocal ranging in an industrial setting as a chromatic confocal point sensor and/or as an "optical pen." One example of optical pen instruments that measure Z height are those manufactured by STIL, S. A. of Aix-en-Provence, France (STIL S. A.). As a specific example, the STIL optical pen model number OP 300NL measures Z heights and has a 300 micron range.

Another configuration for a chromatic confocal point sensor is described in commonly assigned U.S. Pat. No. 7,626,705 (the '705 patent), which is hereby incorporated herein by reference in its entirety. This patent discloses a lens configuration providing an improved optical throughput and an improved spot size which results in improved measurement resolution in comparison with various commercially available configurations.

In a chromatic confocal point sensor, or optical pen, as various components such as lenses, housing and mounting elements experience expansion or contraction under temperature changes, the total optical power of the optical pen changes. This thermal sensitivity changes the Z height where a given wavelength is best focused, and therefore introduces errors in surface height measurements. For various applications, improvements in optical pen thermal sensitivity in order to maintain sufficient performance with respect to accuracy, spot size, and so on, are desirable.

The present invention is directed to providing an improved lens configuration for a thermally compensated optical pen, in order to provide more repeatable and reliable chromatic range sensing with respect to temperature variations.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A chromatic sensor lens configuration including thermal compensation is provided for a thermally compensated chromatic confocal point sensor optical pen. In accordance with one aspect of the invention, in one embodiment, the chromatically dispersive lens configuration including thermal compensation is utilized in an optical element portion of a chromatic confocal point sensor optical pen that also includes a housing, an in/out optical fiber, and a detector aperture. The in/out optical fiber outputs source radiation and receives reflective radiation through the detector aperture. The lens configuration is arranged along an optical axis. The lens configuration receives the source radiation from the aperture, and focuses it with axial chromatic dispersion towards the workpiece surface. It also receives reflected radiation from the workpiece surface and focuses the reflected radiation proximate to the detector aperture with axial chromatic dispersion.

In accordance with another aspect of the invention, in one embodiment, the chromatically dispersive lens configuration includes a doublet lens element and a positive power lens portion located farther from the aperture than the doublet lens element. The doublet lens element includes a first portion located near the aperture and a second portion located farther from the aperture. In one embodiment, the positive power lens portion includes a bi-convex lens element located proximate to the second portion of the doublet lens element, a first meniscus lens element located proximate to the bi-convex lens element and a second meniscus lens element located proximate to the first meniscus lens element.

Each lens element of the chromatically dispersive lens configuration is characterized by an optical power $\phi_i$, a coefficient of thermal expansion $\alpha_{Ti}$, an index of refraction $n_i$ and a coefficient of thermal defocus $\chi_i$ over a range of temperature T (e.g., from 10° C. to 30° C.), where:

$$\chi_i = \alpha_{Ti} - \frac{1}{n_i - 1} \frac{dn_i}{dT} = -\frac{1}{\phi_i} \frac{d\phi_i}{dT}$$

In accordance with a further aspect of the invention, at least two lens elements of the positive power lens portion (in one embodiment at least two of the biconvex lens, the first meniscus lens and the second meniscus lens), are selected to at least partially compensate for the overall thermal sensitivity of the optical pen (e.g., arising from thermal expansion of the housing, thermal defocus of the doublet lens portion and the like). For example, in one embodiment, at least two of the biconvex lens, the first meniscus lens and the second meniscus lens that compensate for thermal sensitivity of the chromatic confocal point sensor optical pen have a coefficient of thermal defocus $\chi_i$ that is in a range that is at lowest 10 ppm per °C. In some embodiments, the first meniscus lens and the second meniscus lens, in particular, are selected in this way to compensate for thermal sensitivity of the chromatic confocal point sensor optical pen arising from thermal expansion from the housing.

In accordance with another aspect of the invention, in one embodiment, the chromatic confocal sensor pen further comprises an assembly element and an end element and at least two lens elements of the positive power lens portion compensate for the overall thermal sensitivity of the chromatic confocal point sensor optical pen, including thermal sensitivity arising from thermal expansion of the housing and additionally including thermal sensitivity arising from thermal expansion of the assembly element and the end element.

In accordance with another aspect of the invention, in one embodiment, the chromatic confocal sensor optical pen further comprises an in/out fiber optic sub-assembly and at least two elements of the positive power lens portion compensate for the overall thermal sensitivity of the chromatic confocal point sensor optical pen, including thermal sensitivity arising from thermal expansion of the housing and additionally including thermal sensitivity arising from thermal expansion of the in/out fiber optic sub-assembly.

In accordance with another aspect of the invention, in one embodiment, each lens element of the chromatically dispersive lens configuration is made of a glass material.

In accordance with another aspect of the invention, in one embodiment, each lens element of the chromatically dispersive lens configuration has spherical surfaces. The utilization of spherical lenses reduces the complexity and overall expense of the lens configuration.

A chromatic confocal point sensor optical pen using a chromatically dispersive lens configuration including thermal compensation according to this invention has the advantage of a decreased thermal sensitivity while maintaining a desirable optical throughput, spot size, measurement range and standoff, while using a relatively simple lens configuration. Previously, such simple optical pen lens configurations (e.g., as disclosed in the '705 patent) were associated with significantly higher thermal sensitivities. For example, in one embodiment, an optical pen according to the '705 patent may have a thermal sensitivity on the order of 210 nm/° C., whereas an optical pen using a chromatically dispersive lens configuration including thermal compensation according to this invention may have a thermal sensitivity of on the order of 70 nm/° C. using similar housing materials, or less if other materials and design features are also modified.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a table showing one exemplary set of Abbe numbers, refractive indices, coefficients of thermal defocus and coefficients of thermal expansion for the lens elements of the lens configuration of FIG. 1;

DETAILED DESCRIPTION OF THE PREFERRED EMBODIMENT

Figure 1:
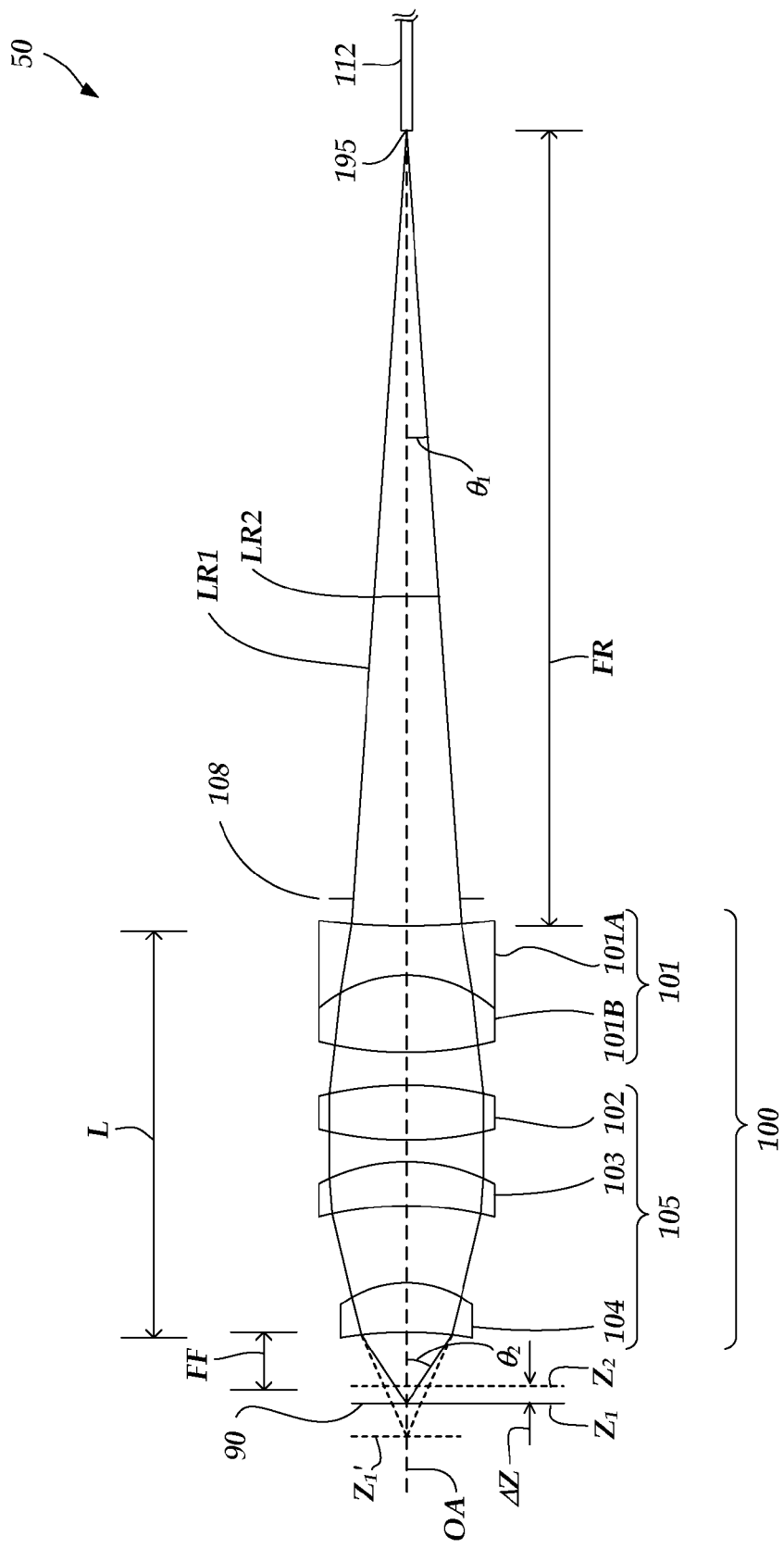
FIG. 1 is a diagram of a schematic side view of an exemplary embodiment of a chromatically dispersive lens configuration that may include thermal compensation according to this invention.

FIG. 1 is a diagram 50 of a schematic side view of the operation of an exemplary embodiment of a chromatically dispersive lens configuration 100, according to this invention. The lens configuration 100 includes a doublet lens element 101, and a positive power lens portion 105. It will be appreciated that the lens configuration 100 is exemplary only, and not limiting. In various embodiments, the positive power lens portion comprises at least two lens elements. In some embodiments, the positive power lens portion comprises at most four lens elements. In the specific embodiment shown in FIG. 1, the positive power lens portion 105 includes a biconvex lens element 102, and meniscus lens elements 103 and 104. The doublet lens element 101 is formed from a first lens portion 101A and second lens portion 101B. The meniscus lens elements 103 and 104 have both surfaces curved in the same direction, and are oriented so as to provide positive optical power and focus the radiation output from the lens configuration 100, approximately as shown in FIG. 1. In the configuration illustrated in FIG. 1, the spherical aberration of the positive power lens portion 105 may be more easily controlled or configured by splitting the focusing lens operations into the three air spaced singlet lenses 102-104. In addition, according to this invention, the three air spaced singlet lenses 102-104 comprise parameters which compensate for thermal expansion of a housing and additional elements of an optical pen which is described in further detail below.

As will be described in more detail below with respect to FIG. 4, during operation, light from an in/out optical fiber 112 is output from a detector aperture 195 that is fixed relative to the lens configuration 100 to provide an output light beam along an optical axis. In one embodiment, the end of the core of the in/out optical fiber 112 may provide the aperture 195 (e.g., an aperture that is approximately the same as a core diameter of 50 microns, or alternatively 20 microns for a tapered fiber core). The output light beam within the representative limiting rays LR1 and LR2 may be limited by an optional aperture stop 108 and, in any case, may continue through the doublet lens element 101, to be focused on a workpiece surface 90 by the positive power lens portion 105. Upon reflection from the workpiece surface 90, the light is refocused by the lens configuration 100 onto the aperture 195 as illustrated by the limiting rays LR1 and LR2. A distance FR represents the spacing between the back of the lens configuration 100 and the aperture 195. Due to the axial chromatic dispersion provided by lens configuration 100, only one wavelength will be in focus at the surface 90, and the distance from the lens configuration 100 to the surface 90 determines which wavelength is best focused. The wavelength that is best focused at the surface 90 will also be the wavelength that is best focused at the aperture 195. Therefore, the light received into the core of the in/out optical fiber 112 through aperture 195 will be spatially filtered to have predominantly the best focused wavelength. In various embodiments, the in/out optical fiber 112 routes the signal light to a spectrometer (not shown) that is utilized for determining the wavelength corresponding to the highest signal level, thus determining the distance to the workpiece surface 90.

FIG. 1 shows the convergence/divergence angles $\theta_1$ and $\theta_2$ and the front and rear focus dimensions FF and FR. The rear focus dimension FR extends from the aperture 195 to the rear of the lens configuration 100, and a front focus dimension FF extends from the front of the lens configuration 100. In one embodiment, the detector collection numerical aperture ($NA_{det}$) is related to the angle $\theta_1$ by the following equation $$NA_{det} = \sin\theta_1 \quad \text{(Eq. 1)}$$

In addition, the object numerical aperture at the workpiece surface ($NA_{object}$) is related to the focal angle $\theta_2$ by the following equation:

$$NA_{object} = \sin\theta_2 \quad \text{(Eq. 2)}$$

For a given dimension of the aperture 195, the demagnification ratio ($NA_{det}/NA_{object}$) may determine that lateral dimension of the focused measurement spot on the workpiece surface 90. Therefore, the demagnification ratio may be a significant design parameter to be satisfied by the lens configuration 100 in various embodiments, as described in greater detail elsewhere herein.

It will be appreciated that $\sin\theta_2$, and the front focus dimension FF, will generally depend on the wavelength of light, due to the axial chromatic dispersion provided by the lens configuration 100. Various considerations related to providing a desirable axial chromatic dispersion are described in greater detail below. FIG. 1 also shows a lens group length dimension L, representing the axial dimension spanned by the lens configuration 100. Since a compact chromatic confocal point sensor is generally advantageous, the lens group length dimension L and/or the dimension (FR+L) may be a significant design parameter to be satisfied by the lens configuration 100 in various embodiments. In one specific example embodiment, the sum of the dimensions FR and L is approximately 139 mm, and FIG. 1 is drawn with an approximately correct aspect ratio. However, in various other embodiments the scaled dimensions and aspect ratio of FIG. 1 are illustrative only, and not limiting. More generally, the various embodiments of the particular lens configuration 100 illustrated in FIG. 1 may be implemented and/or adapted to be suitable for a variety of applications (e.g., by selection of suitable lens element surface radii and axial spacings) based on reasonable variations of the lens surface configurations shown in FIG. 1 and the material properties shown and described below with reference to FIG. 2, along with the use of known analytical and/or computerized optical design and/or simulation techniques to guide those variations.

For a given geometry the front focus dimension FF and the amount of axial chromatic dispersion provided by the lens configuration 100 generally depends on the refractive indices and Abbe numbers of the lenses 101-104. As described in Warren J. Smith, *Modern Optical Engineering*, Third Edition, p. 94, McGraw-Hill, 2000, the material refractive index variation with wavelength causes the axial separation of focus, and the Abbe number quantifies index variation with wavelength, in accordance with the following equation:

$$v_d = \frac{n_d - 1}{n_F - n_C} \quad \text{(Eq. 3)}$$

Where $v_d$ is the Abbe number and $n_d$, $n_F$, and $n_C$ are the material refractive indices at the helium d line, 587.6 nm, and the hydrogen F and C lines (486.1 nm and 656.3 nm, respectively). Smaller Abbe numbers imply greater focal variation with wavelength.

Furthermore, as described in Joseph M. Geary, *Introduction to Lens Design*, p. 176, Willmann-Bell, 2002, the focal length variation for a singlet lens between F and C wavelengths is given by:

$$\Delta f_{FC} = \frac{f_d}{v_d} \quad \text{(Eq. 4)}$$

where $f_d$ is the focal length at the helium d wavelength (587.6 nm). Again, lenses using smaller Abbe number glasses have greater focal length shifts with wavelength.

In various embodiments, the doublet lens element 101 and the positive power lens portion 105 may be configured with various combinations of features according to this invention, in order to provide various desirable attributes for an optical pen. In various embodiments, the doublet lens element 101 is not a typical doublet lens. In general, the first lens portion 101A, which is nearer to the aperture 195, comprises at least one concave surface, and the second lens portion 101B, which is further from the aperture 195, comprises at least one convex surface. In various embodiments the first lens portion 101A has a relatively lower Abbe number while the second lens portion 101B has a relatively higher Abbe number. In contrast, the relationship between the Abbe numbers of the corresponding first and second portions of conventional doublet lenses is reversed compared to the first and second lens portions 101A and 101B.

In various embodiments the doublet lens element 101 may generally be a low powered lens element, or a negative power lens element, or both. In the particular embodiment illustrated in FIG. 1, it is a low power negative power lens element, which generally expands the output beam received from the aperture 195. In one embodiment, the doublet lens element 101 provides a negative power lens element, where the magnitude of the negative power is at most 50% of the total power of the lens configuration 100. In various other embodiments, the doublet lens element 101 may comprise a low power positive lens element, provided that other design principles disclosed herein are fulfilled. For example, in some embodiments, the magnitude of the positive power may be at most approximately 20% of the total power of the lens configuration 100.

In the embodiment illustrated in FIG. 1, the configuration of the positive power lens portion 105 includes the three air spaced singlet lens elements 102-104. In one embodiment, each of the lens elements 102-104 has spherical surfaces. The utilization of spherical lenses may reduce the overall expense of the lens configuration. In one embodiment, all of the lens elements of the lens configuration 100 are spherical lenses. In one embodiment, each lens element of the chromatically dispersive lens configuration is made of a glass material.

Proper characteristics for the doublet lens element 101 are essential to provide desired optical properties with respect to axial chromatic dispersion and optical power of the chromatically dispersive lens configuration 100. Because the doublet lens element 101 uses a less conventional arrangement with respect to Abbe numbers, as described above, it has a relatively limited set of options for design of its lenses. Nevertheless, it is desirable to have some means to compensate for thermal sensitivity of optomechanical components of an optical pen using the chromatically dispersive lens configuration 100 through appropriate lens selection. According to the present invention, it is desirable to select elements of the positive power lens portion 105 as the primary means to compensate for the overall thermal sensitivity of an optical pen rather than to jeopardize the performance of the doublet lens element 101. Of course, it is also very important to maintain a sufficient overall optical performance of the lens configuration 100 for chromatic range sensing while providing reduced thermal sensitivity.

Various approaches to reducing thermal sensitivity in optical systems are known in the art. Some systems use an active optical element to compensate for thermal sensitivity, such as a mechanical portion for moving lens elements in response to thermal change as indicated by a thermal sensor. Other systems use passive athermalization, which in many systems relies upon matching thermal expansions of optical and mechanical elements to compensate for each other such that a system has a reduced thermal sensitivity. For example, an article by Thomas H. Jamieson, "Thermal Effects in Optical Systems," *Optical Engineering* 20(2), 156-160 March/April 1981, discloses a method for compensating for thermal sensitivity in a Galilean laser beam expander comprising an objective, an eyepiece and a metal housing to maintain a more stable amount of magnification under changes in temperature. Matching the coefficients of thermal expansion of materials of each element allows for changes in optical power of the objective and the eyepiece to compensate for the thermal expansion of the metal housing by approximating for thin lens relationships according to the equation:

$$x_e = x_m(M-1) - Mx_o \quad \text{(Eq. 5)}$$

where $x_o$ is the coefficient of thermal expansion of the objective, $x_e$ is the coefficient of thermal expansion of the eyepiece and $x_m$ is the coefficient of thermal expansion of the metal housing.

Another approach to reducing thermal sensitivity in a multiple lens system is described in Michael Bass et al., *Handbook of Optics, Third Edition Volume II*, p. 8.13, McGraw-Hill, 2009. For a system of j lenses in contact with each other in a housing element, approximating for thin lens relationships, a system which is compensated for thermal sensitivity by passive athermalization may be constructed according to the equation:

$$\Sigma_{i=1}^{j}(\gamma_i \phi_i) + \phi \alpha_h = 0 \quad \text{(Eq. 6)}$$

where T is a temperature, $\gamma_i$ is a coefficient of thermal defocus of each lens, $\phi_i$ is an optical power of each lens, $\phi$ is a total optical power of the multiple lens system, $\alpha_h$ is a coefficient of thermal expansion of the housing element and:

$$\gamma_i = \frac{1}{\phi_i} \frac{d\phi_i}{dT} \quad \text{(Eq. 7)}$$

An optical system which comprises lenses and a housing that meet this condition will have a low thermal sensitivity.

In more complex optical systems, it is often necessary to account for additional factors such as the thickness of lenses, separation of lenses and expansion of mounting structures within a housing. For example, optical pens within the scope of this invention have intentional axial chromatic aberration, a high object numerical aperture $NA_{object}$ at a typical distance to a workpiece surface, and a significant separation between each lens element, such that thin lens approximations are not effective for characterizing thermal sensitivity. In order to construct the lens configuration 100 for an optical pen with passive athermalization it is also necessary to account for factors such as expansion of a fiber mounting. Therefore, it is generally more desirable to use an optical simulation computer program to simulate the thermal sensitivity of such optical systems for a desired matching of thermal sensitivity of each element. This also provides a means to compare optical performance of various alternative embodiments which is discussed in further detail with respect to FIG. 3.

The thermal sensitivity of each lens element of the lens configuration 100 may be characterized in terms of a coefficient of thermal defocus $\chi_i$ over a range of temperature T (e.g., from 10° C. to 30° C.) which is defined as the relation:

$$\chi_i = \alpha_{Ti} - \frac{1}{n_i - 1} \frac{dn_i}{dT} = -\frac{1}{\phi_i} \frac{d\phi_i}{dT} \quad \text{(Eq. 8)}$$

where $\alpha_{Ti}$ is a coefficient of thermal expansion of a respective lens element, $n_i$ is an index of refraction of a respective lens element and $\phi_i$ is an optical power of a respective lens element. As a lens experiences thermal expansion or contraction due to a change in the temperature T, and the index of refraction $n_i$ of that respective lens changes with temperature, a focal length of that respective lens will change, thus modifying the respective optical power $\phi_i$. As a total optical power of the lens configuration changes, the position along the optical axis where a given wavelength of illumination is focused on a surface changes and this introduces errors in surface height measurements. As shown in FIG. 1, the surface 90 is located at a coordinate $Z_1$ along the optical axis. A change in temperature T causes a wavelength of light $\lambda_1$ that would nominally be best focused at $Z_1$ to be best focused at a coordinate $Z_1'$. As a result, a different wavelength of light $\lambda_2$ is best focused at the coordinate $Z_1$. Generally a coordinate Z along the optical axis is a function of the wavelength, i.e., $Z = f(\lambda)$. Because the different wavelength of light $\lambda_2$ is best focused at the surface 90, an optical pen will measure the surface 90 at a coordinate $Z_2 = f(\lambda_2)$, where $Z_2 = Z_1 + \Delta Z$, and $\Delta Z$ represents a measurement error arising from thermal sensitivity of an optical pen using the lens configuration 100. A total thermal sensitivity of an optical pen using the lens configuration 100 may be characterized in terms of:

$$\frac{\Delta Z}{\Delta T} = \frac{Z_2 - Z_1}{\Delta T} \quad \text{(Eq. 9)}$$

for a given wavelength of light or averaged over several wavelengths of light.

In various embodiments according to this invention, at least two of the lens elements of the positive power lens portion 105 at least partially compensate for the overall thermal sensitivity of a chromatic confocal point sensor optical pen including thermal sensitivity arising from thermal expansion of a housing element and the average of the coefficients of thermal defocus $\chi_i$ of the lens elements of the positive power lens portion 105 that compensate for the overall thermal sensitivity of a chromatic confocal point sensor optical pen is in a range that is at lowest 10 ppm per ° C. In various embodiments, the first meniscus lens element 103 and the second meniscus lens 104 compensate for thermal sensitivity of a chromatic confocal point sensor optical pen. It should be appreciated that in the embodiment shown in FIG. 1, the positive power lens portion 105 includes three lens elements. However, in various alternative embodiments according to this invention, the positive power lens portion may include as few as two lens elements or as many as four elements. In each case, the overall thermal sensitivity of the associated optical pen may be significantly reduced or compensated provided that the positive power lens portion is configured such that the average of the coefficients of thermal defocus $\chi_i$ of at least two of the lens elements of the positive power lens portion is in a range that is at lowest 10 ppm per ° C. This may require selection of some relatively unusual materials for the lens elements of the positive power lens portion, as outlined in greater detail below.

FIG. 2 is a table 200 showing one exemplary set of Abbe numbers $v_i$, indices of refraction $n_i$, coefficients of thermal defocus $\chi_i$, coefficients of thermal expansion $\alpha_{Ti}$, and optical powers $\phi_i$ for the lens elements 101A, 101B, 102, 103 and 104 of FIG. 1. The material properties shown in table 200 may be used in combination with the lens configuration 100 shown in FIG. 1, to provide an embodiment corresponding to any and/or all of the various desirable combinations of features outlined above. More specifically, in the embodiment shown in FIG. 2 the first lens portion 101A has a relatively lower Abbe number of 25.4, a refractive index of 1.8, a coefficient of thermal defocus 6.4 ppm per ° C. and a coefficient of thermal expansion of 8.9 ppm per ° C. The second lens portion 101B has a relatively higher Abbe number of 45.8, a refractive index of 1.5, a coefficient of thermal defocus of 1.5 ppm per ° C. and a coefficient of thermal expansion of 8.2 ppm per ° C. The average Abbe number of the corresponding doublet lens element 101 is therefore 35.6. The lens element 102 has an Abbe number of 35.3, a refractive index of 1.7, a coefficient of thermal defocus of −0.5 ppm per ° C. and a coefficient of thermal expansion of 7.3 ppm per ° C. The lens element 103 has an Abbe number of 63.3, a refractive index of 1.6, a coefficient of thermal defocus of 15.7 ppm per ° C. and a coefficient of thermal expansion of 10.1 ppm per ° C. The lens element 104 has an Abbe number of 26.3, a refractive index of 1.8, a coefficient of thermal defocus of 6.1 ppm per ° C. and a coefficient of thermal expansion of 8.8 ppm per ° C. The average Abbe number of the corresponding positive lens portion 105 is therefore 41.6. In some embodiments, it may be advantageous if the difference between the average Abbe numbers of the doublet lens element 101 and the positive lens portion 105 is at most 10. In the exemplary embodiment shown in FIG. 2, that difference is 6.

In the exemplary embodiment shown in FIG. 2, the meniscus lens element 103 and the second meniscus lens element 104 compensate for thermal sensitivity of a chromatic confocal point sensor optical pen and the average of the coefficients of thermal defocus $\chi_i$ of the meniscus lens element 103 and the second meniscus lens element 104 is 10.88 ppm per ° C. In the exemplary embodiment shown in FIG. 2, the first meniscus lens element 103 and the second meniscus lens element 104 give a necessary balance of thermal sensitivity while maintaining a desired optical performance for the lens configuration 100. In alternative embodiments, an embodiment of the bi-convex lens element 102 may be selected which contributes to the necessary balance of thermal sensitivity which also maintains the desired optical performance. It should be appreciated that for lenses of most glass types, a coefficient of thermal defocus $\chi_i$ above 10 ppm per ° C. is relatively uncommon, which limits the possibilities of lenses which fulfill the criteria for lens configuration 100.

It should be appreciated that in an optical pen using the lens configuration 100, that the elements of positive power lens portion 105 configured according to this invention compensate for changes in spacing between each lens element arising from thermal expansion or contraction of optomechanical elements of that optical pen. Optomechanical portions of such an optical pen are discussed in detail with respect to FIG. 3.

Figure 3:
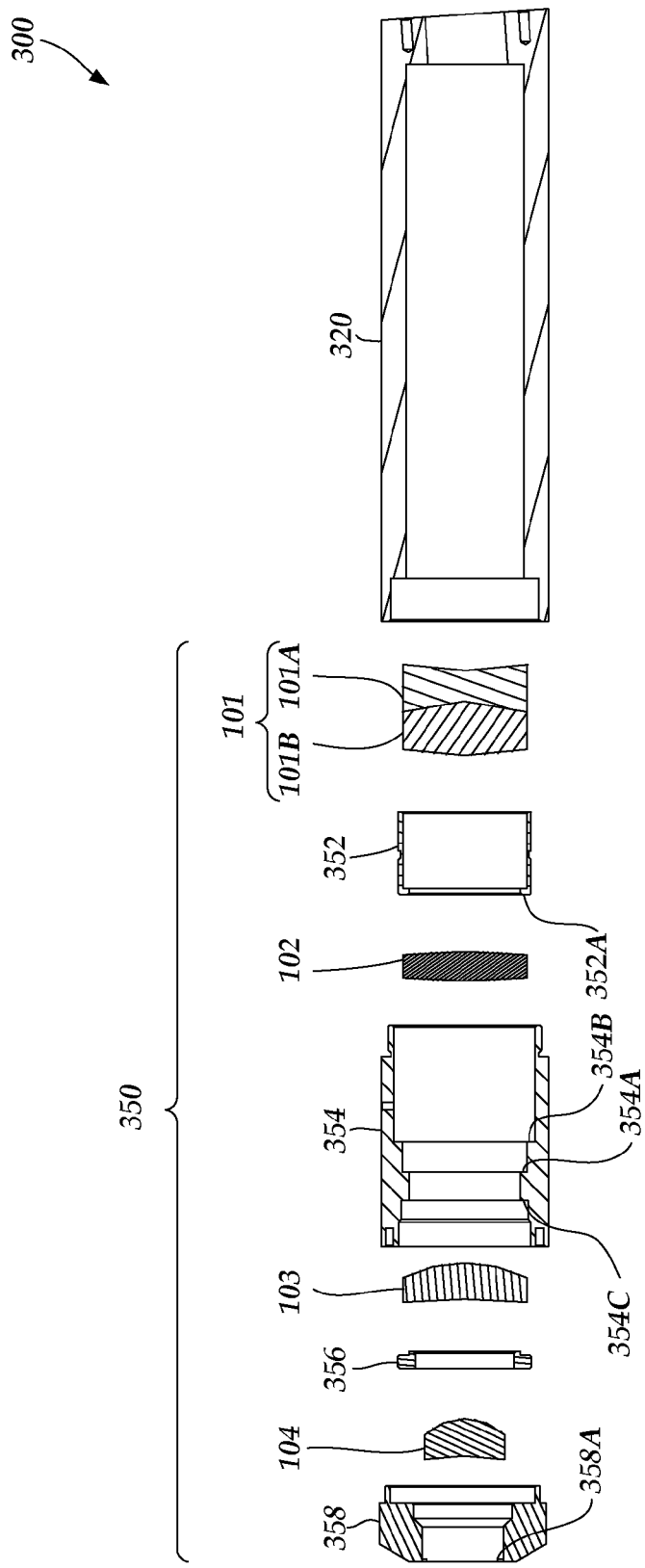
FIG. 3 is a diagram of an exploded view of selected portions of an exemplary chromatic confocal point sensor optical pen configuration, including the lens configuration of FIG. 1.

FIG. 3 is a diagram of an exploded view of selected portions of an exemplary chromatic confocal point sensor optical pen 300 including the elements of the lens configuration 100 of FIG. 1. The selected portions of the chromatic confocal point sensor optical pen 300 include a housing assembly 320 and an optics portion 350, wherein the optics portion 350 includes the elements of the lens configuration 100 in addition to other components. More specifically, in the embodiment shown in FIG. 3, the optics portion 350 includes the lens elements 101A, 101B, 102, 103 and 104, as well as a retaining element 352 including a positioning shoulder 352A, an assembly element 354 including positioning shoulders 354A-354C, a retaining ring 356 and an end element 358 including a positioning shoulder 358A.

When assembled, the lens element 102 may abut the positioning shoulder 354A and a first side of the positioning shoulder 352A, while lens element 101 may abut the other side of the positioning shoulder 352A. The lens element 103 may abut the positioning shoulder 354C and the retaining ring 356. The lens element 104 may abut the positioning shoulder 358A. The assembly element 354 may approximately abut the end element 358 and the housing 320. Any elements not held in place by compression, adjacent surfaces, and/or friction forces may be fixed in position by adhesive or other conventional means.

As discussed with respect to FIG. 2, the elements of the positive power lens portion 105 which compensate for thermal sensitivity of the chromatic confocal point sensor optical pen 300 must be chosen to give a balance between changes in spacing of each lens element arising from thermal expansion or contraction of optomechanical elements of the chromatic confocal point sensor optical pen 300. In one embodiment, at least two lens elements of the positive power lens portion 105 at least partially compensate for the overall thermal sensitivity of the chromatic confocal point sensor optical pen 300, including thermal sensitivity arising from thermal expansion of the housing element 320 and additionally including thermal sensitivity arising from thermal expansion of the assembly element 354 and the end element 358. In general, an optical simulation computer program may be used to model both the thermal sensitivity of the lens configuration 100 and optomechanical components of the chromatic confocal point sensor optical pen 300. Factors included in an optical simulation computer program may comprise changes in the positions of lens elements arising from thermal expansion or contraction of the housing assembly 320, the assembly element 354, and the end element 358, as well as changes in thickness of each lens element and changes in surface curvature of each lens element of the lens configuration 100.

In particular, for a first lens configuration it may be useful to compare the result of a first simulated total thermal sensitivity with a first experimental total thermal sensitivity. In this manner, additional unknown factors contributing to thermal sensitivity of the chromatic confocal point sensor optical pen 300 which have not been considered in the simulation may be quantified. It has been observed that under a simple change of lenses for the positive lens configuration 105 with the same housing assembly 320, assembly element 354, and end element 358, that the difference between a simulated thermal sensitivity and an experimental thermal sensitivity is approximately constant, that is:

$$\frac{\Delta Z_{tsim2}}{\Delta T} - \frac{\Delta Z_{texp2}}{\Delta T} \approx \frac{\Delta Z_{tsim1}}{\Delta T} - \frac{\Delta Z_{texp1}}{\Delta T} \quad \text{(Eq. 10)}$$

An improved second lens configuration may be determined by selecting lenses for an embodiment of positive lens configuration 105 which match a second simulated total thermal sensitivity to the difference between the first simulated total thermal sensitivity and the first experimental total thermal sensitivity:

$$\frac{\Delta Z_{tsim2}}{\Delta T} \approx \frac{\Delta Z_{tsim1}}{\Delta T} - \frac{\Delta Z_{texp1}}{\Delta T} \qquad \text{(Eq. 11)}$$

In this manner, the second lens configuration is chosen to additionally compensate for the unknown factors which contribute to thermal sensitivity rather than simply choosing the second lens configuration for a low thermal sensitivity under simulation.

Figure 4:
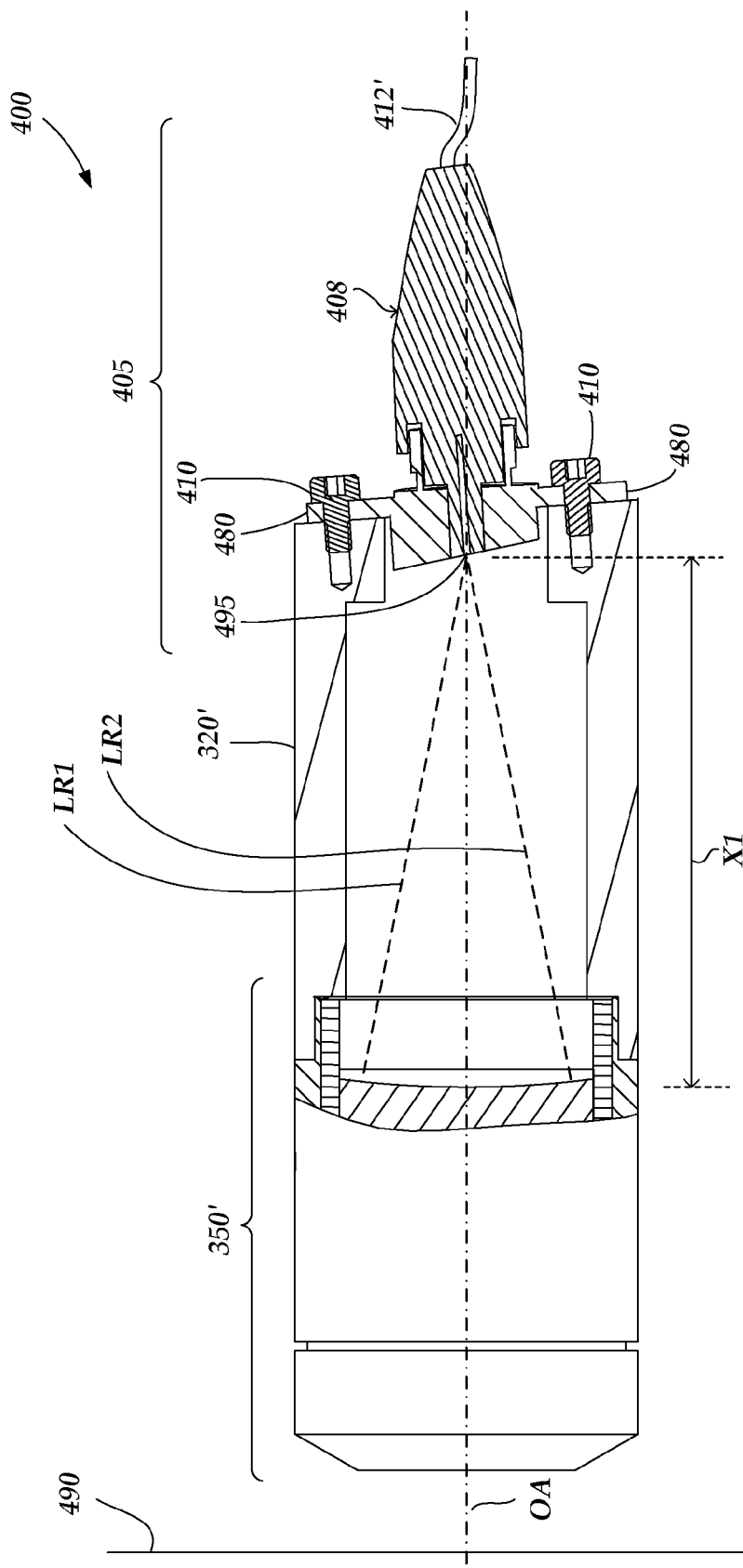
FIG. 4 is a diagram of a cross-section of an assembled chromatic confocal point sensor optical pen, including components similar to those shown in FIG. 3, and further including an in/out fiber optic portion.

FIG. 4 is a diagram of a cross-section of an assembled chromatic confocal point sensor optical pen 400. As shown in FIG. 4, the chromatic confocal point sensor optical pen 400 includes a housing assembly 320' and an optics portion 350', which may be similar or identical to the similarly numbered (unprimed) components shown in FIG. 3. In any case, the optics portion 350' includes a chromatically dispersive lens configuration according to this invention. The general operation of the chromatic confocal point sensor optical pen 400 may be understood based on the previous figures and description disclosed herein.

The chromatic confocal point sensor optical pen 400 further includes an in/out fiber optic sub-assembly 405 that includes a mounting element 480, that may be attached to the end of the housing 320' using mounting screws 410. The in/out fiber optic sub-assembly 405 receives an in/out optical fiber (not shown) through the fiber optic cable 412' which encases it, and through a fiber optic connector 408. The in/out optical fiber outputs an output beam through an aperture 495, and receives reflected measurement signal light through the aperture 495, in a manner similar to that previously described with reference to the in/out optical fiber 112 and the aperture 195 shown in FIG. 1. In one embodiment, the aperture 495 is provided by the end of a core of the in/out optical fiber. However, in various other embodiments, the in/out fiber optic sub-assembly 405 may comprise a separate aperture element (not shown) that provides the aperture 495, as is described in more detail in copending and commonly assigned U.S. Publication No. 2008/0239323 A1, titled "Chromatic Confocal Sensor Fiber Interface," which is hereby incorporated herein by reference in its entirety. It should be appreciated that an optical simulation computer program for simulating the thermal sensitivity of the chromatic confocal point sensor optical pen 400 should also take into account thermal expansion or contraction of the in/out fiber optic sub-assembly 405. In one embodiment, lens elements of the positive power lens portion 105 at least partially compensate for the overall thermal sensitivity of the chromatic confocal point sensor optical pen 400, including thermal sensitivity arising from thermal expansion of the housing element 320 and additionally including thermal sensitivity arising from thermal expansion of the in/out fiber optic sub-assembly 405.

It will be appreciated that a chromatically dispersive lens configuration according to this invention has the advantage of a decreased thermal sensitivity while maintaining a comparable optical throughput to similar lens configurations. A lens configuration, according to the principles of this invention, provides a comparable spot size to similar configurations such as the lens configuration disclosed in the '705 patent (about 4 microns), a comparable measurement range (approximately 300 microns) and a comparable standoff (e.g., within about 2% of similar configurations). A chromatic confocal point sensor optical pen using similar lens configurations may have a thermal sensitivity as characterized in Equation 9 of approximately 210 nm/° C., whereas a chromatic confocal point sensor optical pen using a lens configuration according to this invention has a thermal sensitivity of approximately 70 nm/° C.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A chromatic confocal point sensor optical pen operable to provide a signal usable to measure a distance to a surface and compensated for thermal sensitivity, the chromatic confocal point sensor optical pen comprising:
   a housing;
   an aperture that outputs source radiation and receives reflected radiation; and
   a lens configuration arranged along an optical axis of the chromatic confocal point sensor optical pen to receive the source radiation from the aperture, focus the source radiation and output it toward the surface with axial chromatic dispersion, receive reflected radiation from the surface and focus the reflected radiation proximate to the aperture with axial chromatic dispersion, the lens configuration comprising:
      a doublet lens element comprising a first portion located nearer to the aperture and a second portion located farther from the aperture; and
      a positive power lens portion located farther from the aperture than the doublet lens element, the positive power lens portion comprising at least two lens elements,
   wherein:
      each lens element is characterized by an optical power $\phi_i$, a coefficient of thermal expansion $\alpha_{Ti}$, an index of refraction $\eta$ and a coefficient of thermal defocus $\chi_i$ over a range of a temperature T, where $$\chi_i = \alpha_{Ti} - \frac{1}{n_i - 1}\frac{dn_i}{dT} = -\frac{1}{\phi_i}\frac{d\phi_i}{dT};$$

at least two of the lens elements of the positive power lens portion are configured such that they at least partially compensate for an overall thermal sensitivity of the chromatic confocal point sensor optical pen including thermal sensitivity arising from thermal expansion of the housing; and
   the average of the coefficients of thermal defocus $\chi_i$ for at least two of the lens elements of the positive power lens portion is an average coefficient of thermal defocus that falls in a range that is at lowest 10 ppm per ° C.

2. The chromatic confocal point sensor optical pen of claim 1, wherein the lens elements of the positive power lens portion consist of at most four lens elements.

3. The chromatic confocal point sensor optical pen of claim 1, wherein the lens elements of the positive power lens portion comprise:

a bi-convex lens element located proximate to the second portion of the doublet lens element;

a first meniscus lens element located proximate to the bi-convex lens element; and a second meniscus lens element located proximate to the first meniscus lens element.

4. The chromatic confocal point sensor optical pen of claim 3, wherein the average coefficient of thermal defocus for the first meniscus lens and the second meniscus lens falls in the range that is at lowest 10 ppm per ° C.

5. The chromatic confocal point sensor optical pen of claim 3, wherein the lens elements of the positive power lens portion consist of the bi-convex lens element, the first meniscus lens element and the second meniscus lens element.

6. The chromatic confocal point sensor optical pen of claim 3, wherein:

the biconvex lens, the first meniscus lens and the second meniscus lens, respectively, are characterized by coefficients of thermal defocus $\chi_3$, $\chi_4$ and $\chi_5$;

the coefficient of thermal defocus $\chi_4$ is at lowest 15 ppm per ° C.; and the coefficient of thermal defocus $\chi_5$ is at lowest 5 ppm per ° C.

7. The chromatic confocal point sensor optical pen of claim 6, wherein:

the coefficient of thermal defocus $\chi_3$ is at lowest −1 ppm per ° C. and at highest 0 ppm per ° C.;

the coefficient of thermal defocus $\chi_4$ is at lowest 15 ppm per ° C. and at highest 17 ppm per ° C.;

the coefficient of thermal defocus $\chi_5$ is at lowest 5 ppm per ° C. and at highest 7 ppm per ° C.;

the biconvex lens, the first meniscus lens and the second meniscus lens, respectively, are characterized by coefficients of thermal expansion $\alpha_{T3}$, $\alpha_{T4}$ and $\alpha_{T5}$;

the coefficient of thermal expansion $\alpha_{T3}$ is at lowest 7.1 ppm per ° C. and at highest 7.5 ppm per ° C.;

the coefficient of thermal expansion $\alpha_{T4}$ is at lowest 9.9 ppm per ° C. and at highest 10.2 ppm per ° C.; and the coefficient of thermal expansion $\alpha_{T5}$ is at lowest 8.6 ppm per ° C. and at highest 9.0 ppm per ° C.

8. The chromatic confocal point sensor optical pen of claim 3, wherein the bi-convex lens element has an Abbe number of at least 32 and at most 38, the first meniscus lens has an Abbe number of at least 57 and at most 66 and the second meniscus lens has an Abbe number of at least 23 and at most 29.

9. The chromatic confocal point sensor optical pen of claim 3, wherein the bi-convex lens element has an index of refraction of at least 1.7 and at most 1.8, the first meniscus lens has an index of refraction of at least 1.6 and at most 1.7 and the second meniscus lens has an index of refraction of at least 1.7 and at most 1.8.

10. The chromatic confocal point sensor optical pen of claim 3, wherein each of the first and second meniscus lens elements provide positive optical power.

11. The chromatic confocal point sensor optical pen of claim 3, wherein the bi-convex lens element provides positive optical power.

12. The chromatic confocal point sensor optical pen of claim 1, further comprising an assembly element and an end element, wherein the overall thermal sensitivity includes thermal sensitivity arising from thermal expansion of the assembly element and the end element.

13. The chromatic confocal point sensor optical pen of claim 12, further comprising an in/out fiber optic sub-assembly, wherein the overall thermal sensitivity includes thermal sensitivity arising from thermal expansion of the in/out fiber optic sub-assembly.

14. The chromatic confocal point sensor optical pen of claim 1, wherein:

the first portion and the second portion of the doublet lens element respectively comprise coefficients of thermal defocus $\chi_1$ and $\chi_2$;

the coefficient of thermal defocus $\chi_1$ is at lowest 6° C.$^{-1}$ and at highest 7° C.$^{-1}$; and the coefficient of thermal defocus $\chi_2$ is at lowest 1° C.$^{-1}$ and at highest 3° C.$^{-1}$.

15. The chromatic confocal point sensor optical pen of claim 1, wherein:

the first portion and the second portion of the doublet lens element respectively comprise coefficients of thermal expansion $\alpha_{T1}$, and $\alpha_{T2}$;

the coefficient of thermal expansion $\alpha_{T1}$ is at lowest 8.7 ppm per ° C. and at highest 9.1 ppm per ° C.; and the coefficient of thermal expansion $\alpha_{T2}$ is at lowest 8.0 ppm per ° C. and at highest 8.4 ppm per ° C.

16. The chromatic confocal point sensor optical pen of claim 1, wherein each lens element of the lens configuration comprises a glass material.

17. The chromatic confocal point sensor optical pen of claim 1, wherein each lens element of the lens configuration is a spherical lens element.

18. The chromatic confocal point sensor optical pen of claim 1, wherein the lens elements of the lens configuration consist of:

a doublet lens element having a first portion located nearer to the aperture and a second portion located farther from the aperture;

a bi-convex lens element located proximate to the second portion of the doublet lens element;

a first meniscus lens element located proximate to the bi-convex lens element; and a second meniscus lens element located proximate to the first meniscus lens element, wherein:

the bi-convex lens element, the first meniscus lens element and the second meniscus lens element form the positive power lens portion; and the average coefficient of thermal defocus for the first meniscus lens and the second meniscus lens falls in the range that is at lowest 10 ppm per ° C.

19. The chromatic confocal point sensor optical pen of claim 18, wherein:

the biconvex lens, the first meniscus lens and the second meniscus lens respectively comprise coefficients of thermal defocus $\chi_3$, $\chi_4$ and $\chi_5$;

the coefficient of thermal defocus $\chi_4$ is at lowest 15 ppm per ° C.; and the coefficient of thermal defocus $\chi_5$ is at lowest 5 ppm per ° C.

20. The chromatic confocal point sensor optical pen of claim 18, wherein:

the coefficient of thermal defocus $\chi_3$ is at lowest −1 ppm per ° C. and at highest 0 ppm per ° C.;

the coefficient of thermal defocus $\chi_4$ is at lowest 15 ppm per ° C. and at highest 17 ppm per ° C.;

the coefficient of thermal defocus $\chi_5$ is at lowest 5 ppm per ° C. and at highest 7 ppm per ° C.;

the biconvex lens, the first meniscus lens and the second meniscus lens respectively comprise coefficients of thermal expansion $\alpha_{T3}$, $\alpha_{T4}$ and $\alpha_{T5}$;

the coefficient of thermal expansion $\alpha_{T3}$ is at lowest 7.1 ppm per ° C. and at highest 7.5 ppm per ° C.;

the coefficient of thermal expansion $\alpha_{T4}$ is at lowest 9.9 ppm per ° C. and at highest 10.2 ppm per ° C.; and the coefficient of thermal expansion $\alpha_{T5}$ is at lowest 8.6 ppm per ° C. and at highest 9.0 ppm per ° C.

* * * * *